(12) United States Patent
Gabrys

(10) Patent No.: US 6,750,588 B1
(45) Date of Patent: Jun. 15, 2004

(54) HIGH PERFORMANCE AXIAL GAP ALTERNATOR MOTOR

(76) Inventor: Christopher W. Gabrys, 1001 S. Meadows Pkwy. #1126, Reno, NV (US) 89511

( * ) Notice: Subject to any disclaimer, the term of this patent is extended or adjusted under 35 U.S.C. 154(b) by 0 days.

(21) Appl. No.: 10/454,394

(22) Filed: Jun. 3, 2003

Related U.S. Application Data

(60) Provisional application No. 60/385,324, filed on Jun. 3, 2002.

(51) Int. Cl.[7] .............................................. H02K 1/22
(52) U.S. Cl. ....................... 310/268; 310/178; 310/113
(58) Field of Search ........................ 310/269, 113–115, 310/102 R, 102 A, 178, 261

(56) References Cited

U.S. PATENT DOCUMENTS

| | | | | |
|---|---|---|---|---|
| 4,077,678 A | * | 3/1978 | Studer et al. ............... | 310/90.5 |
| 5,097,140 A | | 3/1992 | Crall ............................ | 290/36 |
| 5,278,470 A | * | 1/1994 | Neag ........................... | 310/178 |
| 5,434,462 A | * | 7/1995 | Leupold et al. ............. | 310/178 |
| 5,481,149 A | * | 1/1996 | Kambe et al. ............... | 310/178 |
| 5,587,618 A | * | 12/1996 | Hathaway .................... | 310/178 |
| 5,646,467 A | | 7/1997 | Floresta et al. ............. | 310/268 |
| 5,880,554 A | | 3/1999 | Liu .............................. | 313/309 |
| 5,955,816 A | | 9/1999 | Clifton et al. ............... | 310/261 |
| 5,977,684 A | * | 11/1999 | Lin .............................. | 310/268 |
| 6,051,905 A | * | 4/2000 | Clark ........................... | 310/178 |
| 6,087,753 A | | 7/2000 | Pinkerton .................... | 310/178 |
| 6,124,702 A | | 9/2000 | Pinkerton et al. ............ | 322/90 |
| 6,140,730 A | | 10/2000 | Tkaczyk et al. ............. | 310/181 |
| 6,633,106 B1 | | 10/2003 | Swett .......................... | 310/268 |

* cited by examiner

*Primary Examiner*—Thanh Lam
(74) *Attorney, Agent, or Firm*—J. Michael Neary

(57) ABSTRACT

A brushless electrical machine for converting between electrical and mechanical energy includes a rotor supported on bearings for rotation about an axis of rotation, and a stator that is stationary and magnetically acts upon the rotor. The rotor includes two ferromagnetic rotor portions separated by a magnetic insulator, forming an axial armature air gap between the ferromagnetic rotor portions. At least one of the two ferromagnetic rotor portions has multiple axial extending protrusions facing the axial armature air gap around a circumference. An air core armature having multiple phase windings is located in the axial armature air gap. A ferromagnetic yoke and homopolar flux generator are mounted to the stator. The homopolar flux generator generates homopolar flux in the protrusions of the rotor and the ferromagnetic yoke forms two rotor-to-stator air gaps with the rotor. Each ferromagnetic rotor portion and the rotor-to-stator air gaps provide sufficient distance between the axial armature air gap and the surfaces of the ferromagnetic yoke at the rotor-to-stator air gap such that the circumferential magnetic flux distribution in the ferromagnetic yoke at the surface of the rotor-to-stator air gap is substantially uniform.

In operation, homopolar flux generated in the homopolar flux generator mounted to the stator is passed from the stator to the rotor, and across the axial armature air gap between the two spaced ferromagnetic rotor portions of the rotor, while minimizing any short-circuiting of the flux between the rotor portions with the magnetic insulator. The flux across the axial armature air gap is focused into multiple, axially projecting rays of flux through the multiple axial extending protrusions facing the axial armature air gap, producing flux variations through the armature in the armature airgap. Electrical power is provided to, or extracted from, the air core armature windings, depending on whether the machine is used for motoring or generating power.

26 Claims, 13 Drawing Sheets

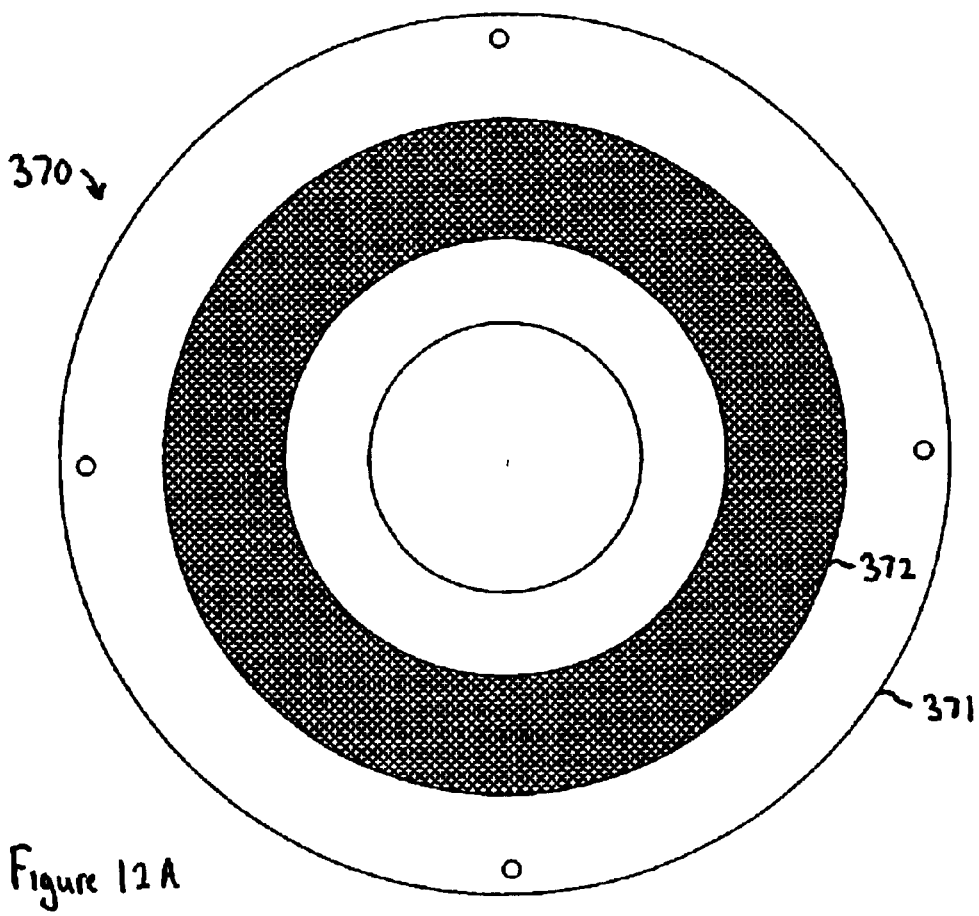
Figure 12A
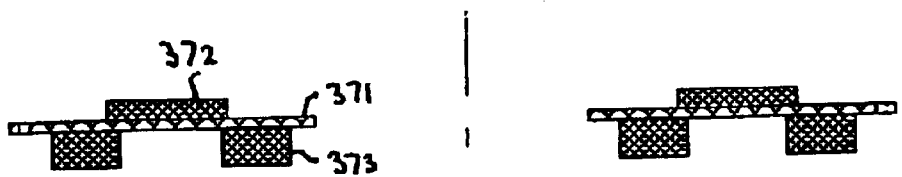
Figure 12B
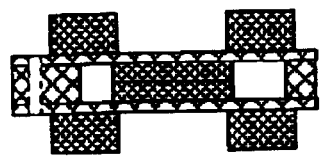
Figure 12C
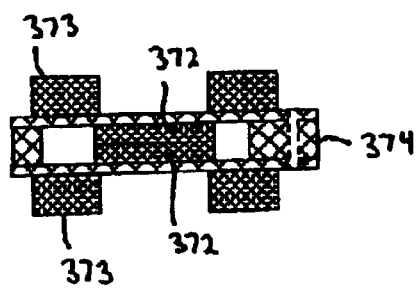

HIGH PERFORMANCE AXIAL GAP ALTERNATOR MOTOR

This relates to a U.S. Provisional Application Serial No. 60/385,324 filed Jun. 3, 2002 and entitled "High Performance Axial Gap Alternator Motor."

This invention pertains to electrical machines for converting between electrical and mechanical energy and more importantly to a brushless, axial gap, air core electrical machine having low cost construction, and improved performance, efficiency and operating characteristics.

BACKGROUND OF THE INVENTION

There is a need for low cost electrical machines for converting between electrical and mechanical energy that have both high efficiency and high performance capability. Unfortunately, current devices tend to suffer from one or more of a number of deficiencies, including low efficiency, low performance or speed capability, complex and expensive construction and poor heat transfer. One factor contributing to both the losses and complexity of many machines is the required use of laminations. Laminations reduce eddy current losses and the materials can be chosen for low hysteresis losses. However, the lamination losses still tend be around 3–4% or higher depending on the lamination thickness, material grade and rotor operating speed.

Another deficiency in many current designs is the result of slot winding. Slot winding allows for placement and structural support of armature windings, and a small air gap. However, these slots undesirably increase the inductance of the armature coils and also cause field variations during rotation, giving rise to additional losses.

Air core type electrical machines can eliminate some of these deficiencies. Unfortunately, current air core electrical machines still suffer from deficiencies that can include required use of laminations, low efficiency, poor heat transfer, and/or complicated, difficult or costly constructions. A better electrical machine having high efficiency, high performance and low costs without the deficiencies of current electrical machines is needed.

SUMMARY OF THE INVENTION

The invention provides a brushless electrical machine, for converting between electrical and mechanical energy, that has high efficiency, high performance and low cost construction. The electrical machine uses an air core armature for high efficiency, eliminates the need for laminations, has an axial gap air core armature for easy construction and assembly, and has a rotor construction suited for very high speed rotation. In some embodiments a controllable field coil is provided that can reduce the cost of drive electronics and provide added power control. In the configurations that use a field coil, the construction provides good support and heat transfer from the coil.

The electrical machine includes a rotor that rotates relative to a stationary stator. The rotor has two ferromagnetic rotor portions that are separated by a magnetic insulator. An axial airgap is formed between the ferromagnetic rotor portions with at least one of the rotor portions having axial protrusions facing the airgap. An axial air core armature is located in the axial armature airgap. The stator of the electrical machine includes a ferromagnetic yoke and a homopolar flux generator. The flux generator generates homopolar flux in the protrusions and across the armature airgap of the rotor by conducting flux through the yoke and to and from the two ferromagnetic rotor portions. The electrical machine eliminates the need for laminations because the stator field is homopolar and also because the axial armature airgap is formed between two sides of the rotating rotor instead of the rotor and stator. Further enabling the low losses, the ferromagnetic rotor portions and rotor-to-stator airgaps are designed to provide sufficient distance between the axial armature airgap and the yoke. The flux must have a large circumferential variation at the axial armature air gap for operation. The circumferential distribution of flux then becomes smoothed to be substantially uniform before entering the yoke, thereby reducing losses and eliminating the need for laminations.

The homopolar flux generator can be a field coil or a permanent magnet. Use of a field coil provides added control as a motor or generator and can reduce the cost of the brushless drive electronics. The field coil is mounted stationary with the yoke, which gives it both good mechanical support and heat transfer for continuous high power operation. If permanent magnets alone are used for the flux generation, they do not give the control benefits achieved with a field coil. However, they are located on the stationary yoke allowing high speed rotor rotation and can be located such that they bound the rotor-to-stator air gaps. In this location, they can further facilitate the flux in the stator yoke to be uniform for low loss. Axial magnetized magnets can be used for increased circumferential uniformity.

In one embodiment of the invention, the rotor is constructed from two solid ferromagnetic plates with the magnetic insulator located in between them. Without having a central hole, the rotor can be rotated to the highest rotational speeds due to lower stresses. In another embodiment, the ferromagnetic rotor portions are made of rings for reduced weight. The magnetic insulator can then be radially reinforced by the ferromagnetic rotor portions for high speed rotation. The magnetic insulator can be any material with low magnetic permeability and sufficient structural properties. Common materials include stainless steel and aluminum. Both have lower strength than high strength steel that can be used for high peripheral speed designs. In another embodiment, the magnetic insulator is constructed of ferromagnetic material and the insulative property is gained geometrically by having high reluctance between the two ferromagnetic rotor portions. In some configurations of the invention the rotor-to-stator air gaps are radial. This eliminates force between the rotor and stator when the rotor is centered in the stator. With axial rotor-to-stator gaps, the rotor can be axially centered to prevent unwanted force generation between the rotor and stator. In yet a further embodiment of the invention, the axial armature air gap is formed by a rotor constructed of an outer rim and an inner return path. A magnetic insulator ring separates the two ferromagnetic rotor portions. The outer rim has axial protrusions and forms the axial armature air gap with the inner return path.

The electrical machines in accordance with the invention can be used for numerous applications where high efficiency and low costs are desired, as well as for use in high speed devices. The invention also provides electrical machines that are axially compact, which may be desirable in some applications. Applications can include but are not limited to flywheel energy systems, generators, high speed machine tool drives, electric drive vehicles as well as common consumer products. The invention is particularly well suited for use in flywheel systems due to the high efficiency, high speed and power capability and low cost construction.

DESCRIPTION OF THE DRAWINGS

The invention, and its many attendant features and benefits, will become better understood upon reading the description of the preferred embodiments in conjunction with the following drawings, wherein:

FIG. 12A is a schematic plan view of an axial gap air core armature for a brushless electrical machine in accordance with the invention.

FIG. 12B is a schematic elevation view of an axial gap air core armature for a brushless electrical machine in accordance with the invention.

FIG. 12C is a schematic elevation view of an alternate construction axial gap air core armature for a brushless electrical machine in accordance with the invention.

DESCRIPTION OF THE PREFERRED EMBODIMENT

Figure 1:
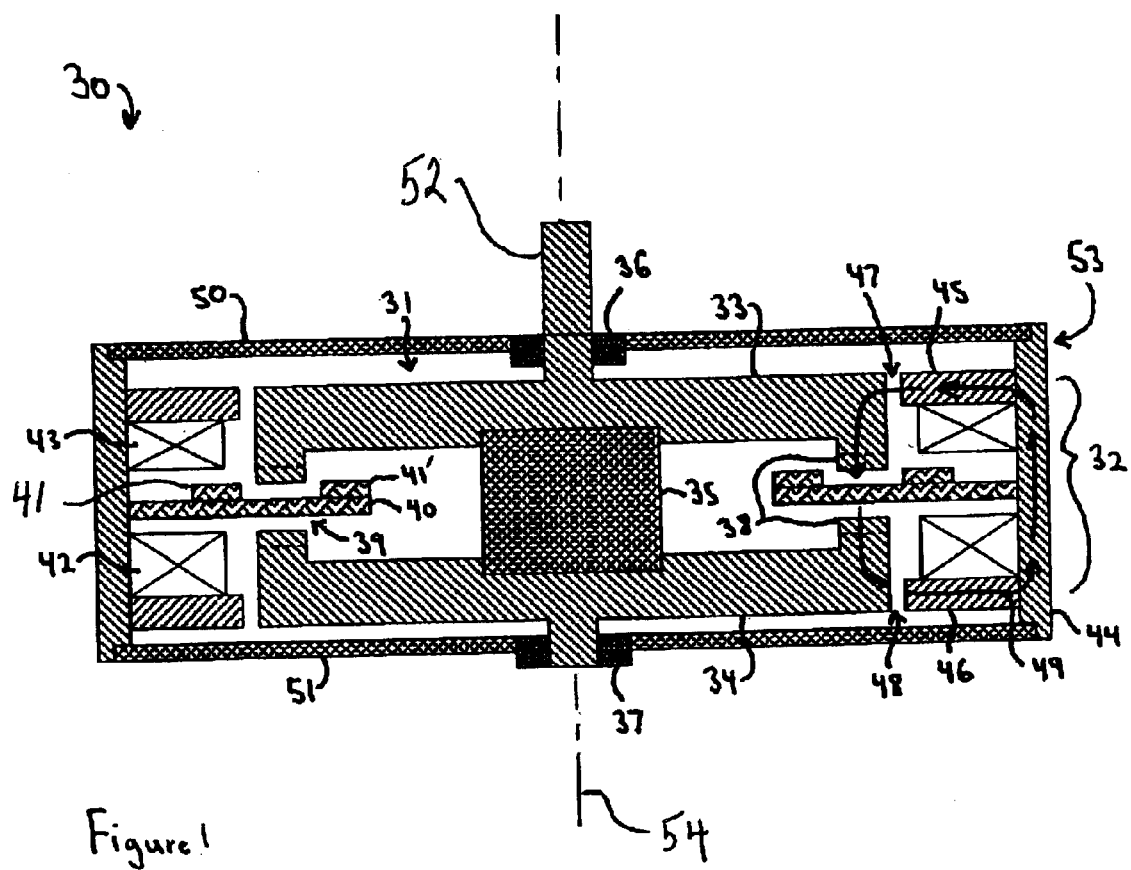
FIG. 1 is a schematic elevation of a brushless electrical machine in accordance with the invention.

Turning to the drawings, wherein like reference characters designate identical or corresponding parts, a brushless electrical motor generator 30, shown in FIG. 1, includes a rotor 31 and a stator 32. The rotor 31 has upper and lower ferromagnetic portions 33, 34 that are separated by a magnetic insulator 35 to form an axial armature air gap 39. The magnetic insulator 35 can be any material with a low magnetic permeability such as stainless steel or aluminum. The insulator 35 can be interference fit inside the ferromagnetic rotor portions 33, 34 by shrink fitting or pressing, as shown, or other methods can be used as are known in the art such as bonding or screwing. In this configuration, the magnetic insulator 35, with lower strength, is limited to a smaller diameter for substantially reduced stresses at high-speed rotation.

Figure 2:
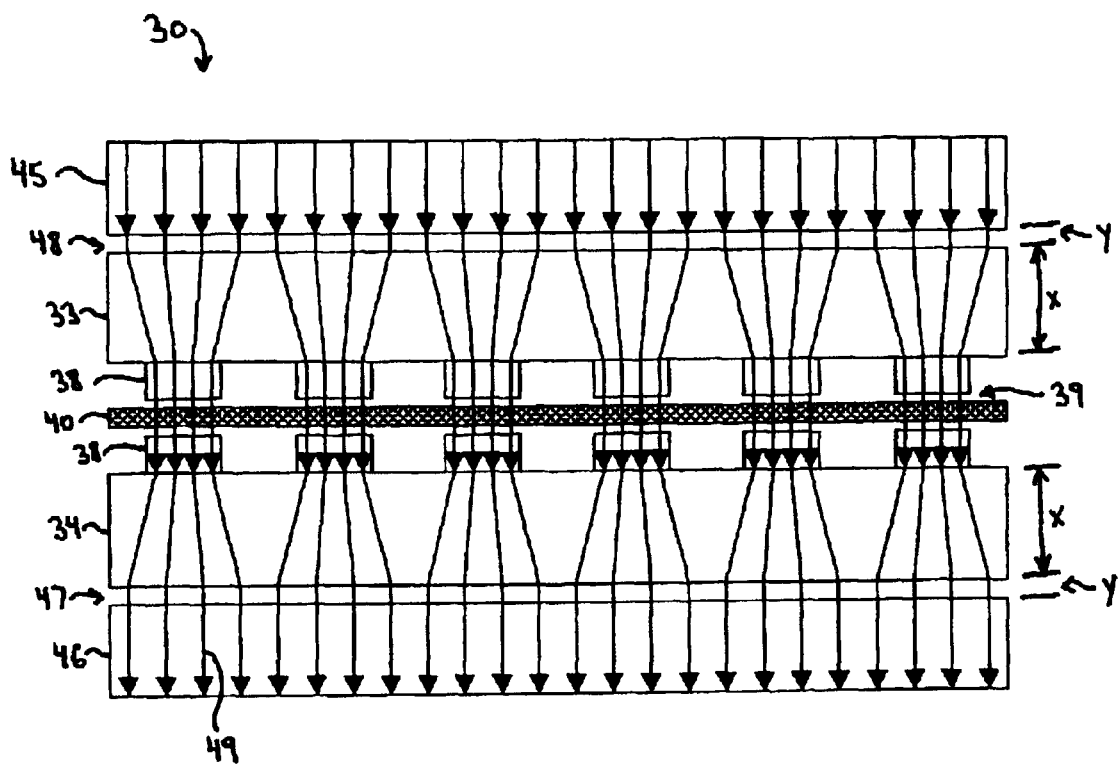
FIG. 2 is a developed schematic drawing of the flux distribution in the brushless electrical machine of FIG. 1.

One or both of the two ferromagnetic rotor portions 33, 34 has multiple axial extending protrusions 38 around a circumference, such as an outer circumference, as shown. As shown in FIG. 2, the protrusions 38 form circumferentially spaced poles of the electrical machine 30 focusing magnetic flux in an annular array of axial rays of flux across the axial armature air gap 39. A stationary annular air core armature 40 is affixed at its outer periphery to the stator 32 and extends into the axial armature air gap 39. Rotation of the rotor 31 causes the array of axial rays of flux to rotate with the rotor 31, resulting in changing flux through the armature 40. The armature 40 is preferably air core, or essentially non magnetic, so as to reduce losses and also have lower inductance. Some ferromagnetic supports could conceivably be used for supporting the armature as long as they were small or not included in the region of the axial armature air gap.

The armature 40 can be constructed from numerous methods including the use of multiple individual copper coils bonded to a fiberglass support or multiple serpentine windings bonded together and to an electrically insulating plate, such as plastic or composite material. Other methods could also be used that provide an axial gap armature that has multiple phases of air core windings. The axial armature air gap 39, in which the armature 40 is located, is bounded on both sides by rotating portions of the rotor 31. This reduces losses that otherwise would occur if one side of the axial armature air gap were bounded by a stationary portion. The armature is structurally self-supporting and rigid, so that it can transfer torque between the stator 32 and the rotor 31 in operation without contacting the rotor at any place around the circumference. Use of an axial gap armature facilitates easier armature construction and higher tolerances. A thin, flat annular armature structure is much easier to make than a cylindrical armature that is perfectly round, as would be required for a radial gap machine with a self-supported armature. Likewise, insertion into the rotor 31 is facilitated by simply axially pushing the two ferromagnetic rotor portions 33, 34 together with the complete armature 40 in the middle.

The device shown in FIG. 1 avoids the need for balancing of the rotor while supporting the air core armature between the rotor halves, which makes construction more difficult. Use of a multiple piece clam shell construction around an air core armature can be done to eliminate the need for armature support during balancing, if desired, by balancing the upper and lower portions 33, 34 before assembly, and then assembling them around the armature 40.

The armature 40 has winding end turns 41 that are preferably located beyond the axial armature air gap 39. As shown in FIG. 1, an outside end turn 41 is radially outside the rotor 31, and the other end turn 41' is between the two rotor portions 33, 34 but radially off-set from the airgap 39.

The rotor 31 is supported for rotation about a vertical axis of rotation 54 on mechanical bearings 36 and 37 mounted to end plates 50 and 51. The end plates 50, 51 are held in position in the ends of an outer tube 44. Although shown using mechanical bearings, other types of bearings could be employed including magnet, air, fluid or combinations. An output shaft 52 is supplied for coupling to other mechanical components, not shown.

The stator 32 is made of multiple ferromagnetic pieces 44, 45, 46, which together comprise a ferromagnetic yoke 53. The inner radially facing edges of the yoke pieces 45 and 46 define, with the outer radially facing surfaces of the rotor portions 33 and 34, respectively, upper and lower rotor-tostator air gaps 47 and 48. One or more annular field coils 42, 43, attached to the yoke 53, are used to generate homopolar flux in a flux path 49 that magnetizes the protrusions 38 on the rotor 31.

As the rotor rotates, AC voltage is generated in the armature 40. Because the field coils 42, 43 are attached to the yoke 53, they can be made larger for lower power losses, and the design also facilitates excellent heat transfer from the coils 42, 43 for good heat transfer from the stator 32. The use of field coils 42, 43 consumes more power for operation than a permanent magnet machine, however they provide controllable operation. The current to the field coils 42, 43 can be varied to control the torque, speed or output power when the machine 30 is used as a generator, thereby potentially reducing the complexity and cost of the drive electronics that provide synchronous power to the armature coils. In motoring operation, synchronous power from a converter or motor drive, not shown, supplies synchronous power to the armature 40. Rotational position sensors or sensorless type motor drives can be utilized. When used as a generator, the rotation of the rotor causes generation of AC voltage in the armature 40. Control of the field current controls the level of voltage generated for a given speed of the rotor 31. As shown in the configuration of the electrical machine 30, the rotor-to-stator air gaps 47,48 are radial, thereby eliminating the development of axial forces on the rotor 31 from the stator 32. The axial loads on the bearings 36, 37 of the electrical machine 30 can therefore be made small. The rotor 31 is preferably radially centered in the stator 32 to prevent radial force generation or magnetic losses.

The flux in the flux path 49 through the stator 32 and the rotor 31 does not vary during rotation of the rotor 31; the flux varies only with respect to the stationary armature 40. The flux distribution in the brushless electrical machine 30 is shown in the developed view of FIG. 2, wherein the electrical machine is shown as unrolled or opened circumferentially for illustrative purposes. In the rotor 31, flux is focused into an array of concentrated axial flux rays in the protrusions 38, and is directed across the axial armature air gap 39. As the rotor 31 rotates, the array of flux rays rotates with the rotor, resulting in periodic variation of flux through the armature 40, causing the generation of a back emf. Likewise, the variation of the flux across the axial armature air gap 39 allows motoring operation by applying synchronous power to the armature 40.

Because the axial armature air gap 39 is bounded on both sides with the rotating ferromagnetic rotor portions 33, 34, the flux does not fluctuate in the rotor 31, preventing any significant losses in the rotor. The flux travels through the ferromagnetic rotor portions 33, 34 and across the rotor-to-stator air gaps 47, 48, and becomes smoothed to be substantially circumferentially uniform. Losses in the stator 45, 46 from the rotation of the rotor are then substantially precluded. Some smoothing occurs in the ferromagnetic pieces 33, 34 and some in the rotor-to-stator air gaps 47,48. Preferably, sufficient distance is provided between the axial armature air gap and the surfaces of the ferromagnetic yoke at the rotor-to-stator air gap such that the circumferential magnetic flux distribution in the ferromagnetic yoke at the surface of the rotor-to-stator air gap is sufficiently uniform to avoid losses due to flux variation in the stator. For a rotor with a large diameter or small number of poles, the distances and required flux smoothing would be greater. Likewise, the required smoothing distances x and y can be reduced by increasing the number of poles of the electrical machine.

Figure 3:
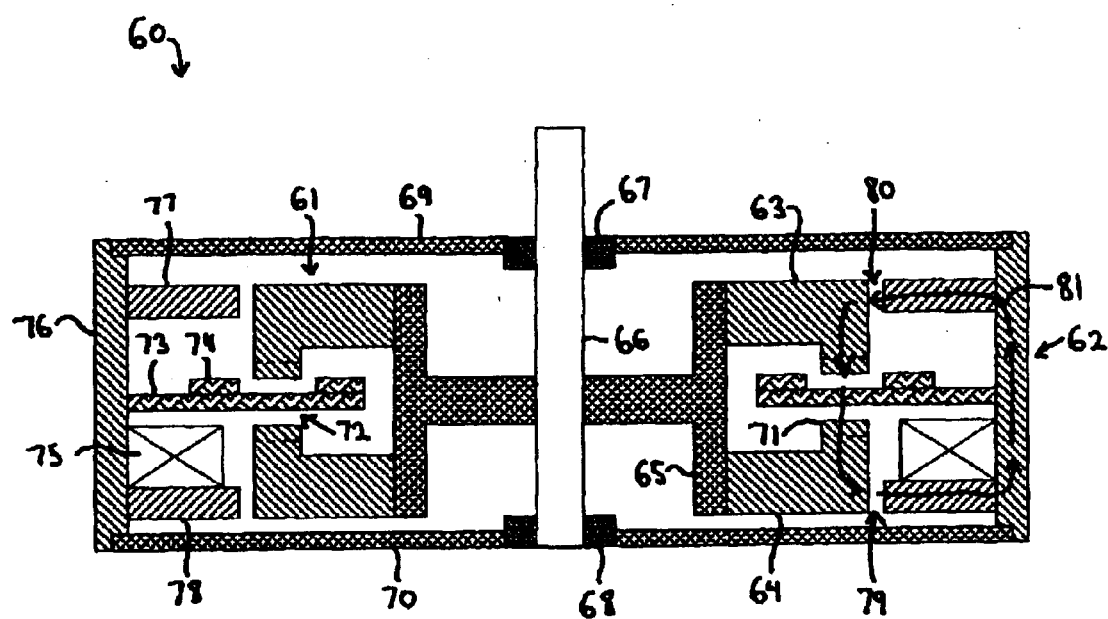
FIG. 3 is a schematic elevation of an alternate configuration brushless electrical machine in accordance with the invention.

In some applications it may be desirable to construct an electrical machine with reduced weight for a given power or torque level. Such a configuration of brushless electrical machine 60, shown in FIG. 3, includes a rotor 61 and a stator 62. The rotor 61 has two ferromagnetic rotor portions 63 and 64 that are separated by a magnetic insulator 65 to form an axial armature air gap 72. In this configuration, the magnetic insulator 65 forms a hub for the rotor and attaches the ferromagnetic rotor portions 63, 64 to a center shaft 66. The shaft is journalled for rotation between two bearings 67, 68 that are mounted to end plates 69, 70. The end plates 69, 70 are held apart by an outer tube 76. One or both of the ferromagnetic rotor portions 63, 64 has multiple axial protrusions 71 that face the axial armature air gap 72. An air core armature 73 is located in the axial armature air gap 72 and has winding end turns 74 preferably radially inside and outside of the axial armature air gap for maximum energy conversion. The air core armature 73 is attached to the outer tube 76 for axial location and for transferring torque and heat. Upper and lower poles 77, 78 and the outer tube 76 form a ferromagnetic yoke. A field coil 75 generates homopolar flux that travels in a flux path 81 through the ferromagnetic yoke 76, 77, 78, across the rotor-to-stator air gaps 79, 80 and through the rotor 61. The heat from the field coil 75 is conducted directly to the stator 62. The field coil 75 generates homopolar flux in the protrusions 71 and an AC voltage in the windings of the armature 73 as the rotor 61 rotates.

Figure 4:
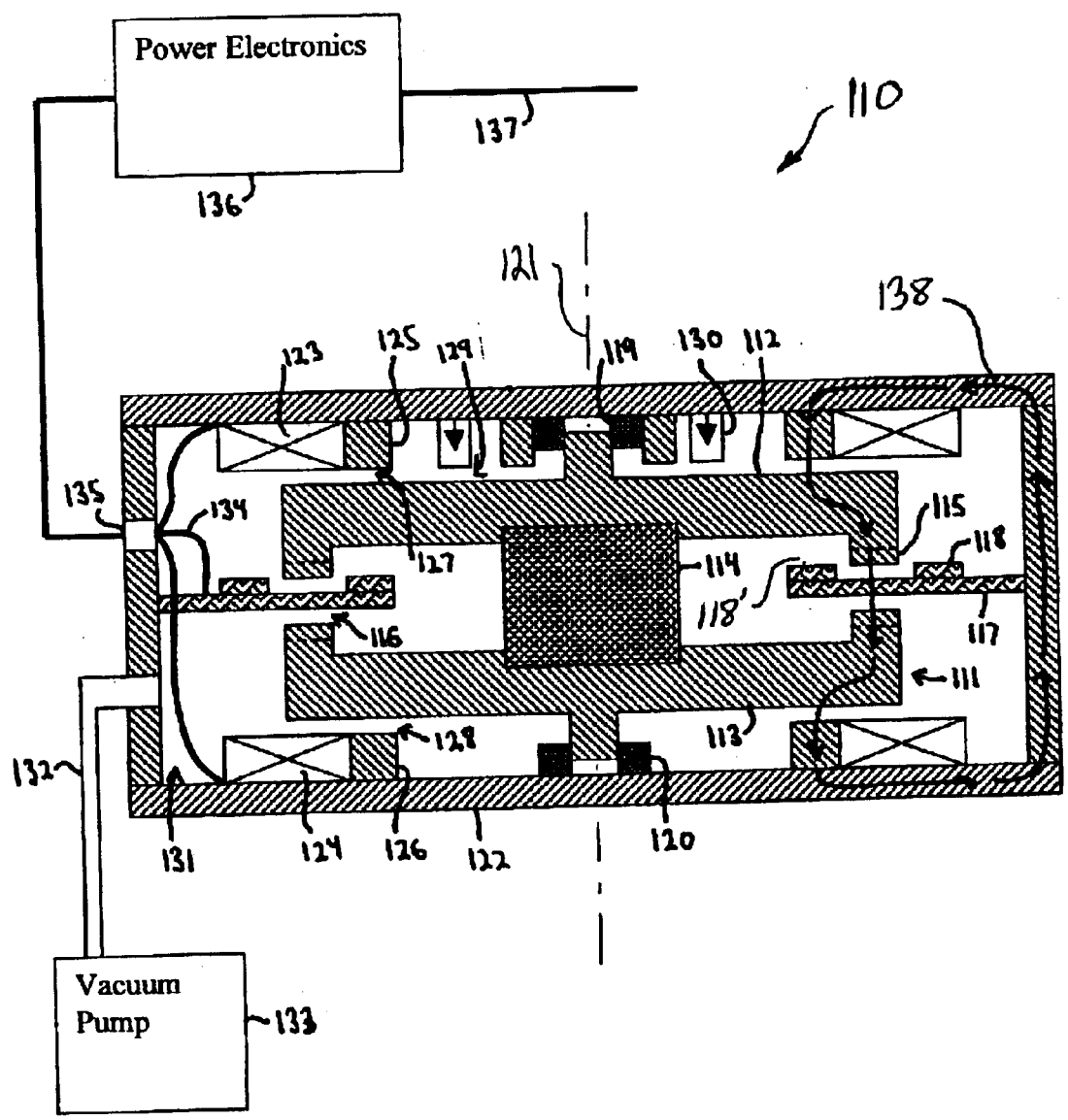
FIG. 4 is a schematic elevation of a flywheel energy system incorporating a brushless electrical machine in accordance with the invention.

One promising application for use of the electrical machine in accordance with this invention is in flywheel energy devices. These devices require high-speed rotation, high efficiency and, in some cases, high power capability. Electrical machines having a field coil also allow easier output voltage regulation during discharging. A flywheel energy system 110 incorporating such a brushless electrical machine, shown in FIG. 4, includes a flywheel rotor 111 that is enclosed within a surrounding container 122. The rotor 111 is constructed of two ferromagnetic cylindrical rotor portions 112, 113 that are separated by a magnetic insulator 114 made of aluminum or stainless steel or the like. An axial armature air gap 116 is formed between the two ferromagnetic rotor portions 112, 113, and an axial gap air core armature 117 is positioned in the gap 116. The end turns 118, 118' of the armature 117 are preferably located at a larger and smaller radial position that the armature airgap 116 for minimum airgap clearance and maximum power.

The flywheel 110 is supported for rotation on upper and lower mechanical bearings 119, 120 that are attached to the housing 122. In this configuration, the flywheel 111 is supported to rotate about a vertical axis 121, and an optional magnetic bearing 129 is employed to lift a portion of the weight of the flywheel 111 for greatly extending the bearing life. The magnetic bearing 129 uses a permanent magnet ring 130 although electromagnets could alternatively be used.

Upper and lower annular field coils 123, 124 generate homopolar flux that is conducted in a flux path 138 to the flywheel 111. The housing 122 and upper and lower poles 125, 126 comprise a ferromagnetic yoke through which flux generated by the coils 123, 124 travels. The flux jumps the rotor-to-stator air gaps 127, 128 and through the flywheel 111 on the flux path 138 shown in the right side of FIG. 4. Because the rotor-to-stator air gaps are axial in direction in this design, a net axial force would be exerted on the flywheel 111 from the yoke 122, 125, 126 if they have different gap distances. Because the field coil current will be varied in operation, the rotor-to-stator gaps are preferably made substantially equal so as to not exert force on the flywheel 111. If the flywheel system 110 were operated with a constant flux, then the upper rotor-to-stator airgap could be made smaller to lift the weight of the flywheel 111. The area of the rotor-to-stator air gaps 127, 128 and the actual distance will also affect the force that would be exerted on the flywheel 111. Although shown with two field coils 123, 124, only one could be used instead. The field coils 123, 124 could be located radially outside of the rotor 111 and serve as added safety containment if desired. Likewise, the rotor-to-stator air gaps 127, 128 could also be made radial. Wires 134 from the field coils 123, 124 and the air core armature 117 exit the container 122 through sealed feedthroughs 135 and are connected to external power electronics 136 that can regulate a power buss 137.

A chamber 131 inside of the container 122 is preferably evacuated to reduce aerodynamic drag on the rotor 111 that would otherwise occur. The vacuum makes efficient heat transfer from the field coils 123, 124 and air core armature 117 important. It is especially important for the field coils 123, 124 if they are operated continuously for online discharge capability. The vacuum in the chamber 131 is maintained by an external vacuum pump 133 that connects to the housing 122 through a vacuum pumping port 132.

Figure 5:
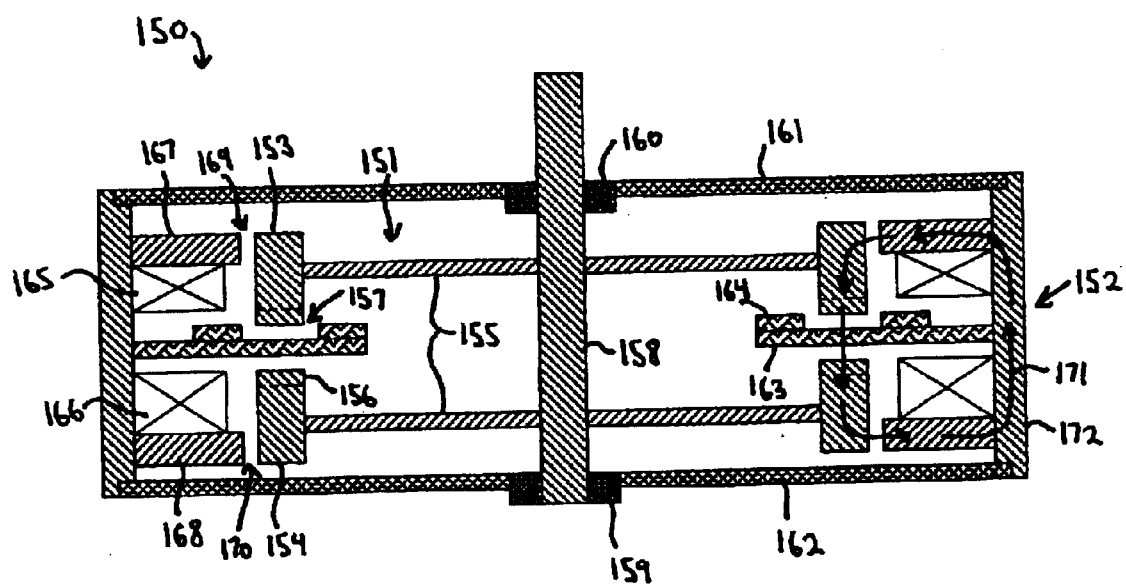
FIG. 5 is a schematic elevation of a second alternate configuration brushless electrical machine in accordance with the invention.

A second alternate configuration brushless electrical machine 150, shown in FIG. 5, includes a magnetic insulator that is actually constructed from ferromagnetic material. The electrical machine 150 is constructed with a rotor 151 and a stator 152. The rotor 151 is comprised of two ferromagnetic rotor portions 153, 154 that are separated by a magnetic insulator 155 and connected by a shaft 158. The magnetic insulator 155 magnetically insulates between the two ferromagnetic rotor portions 153, 154 by geometrically having a high reluctance. The shaft 158 can have a small cross sectional area that allows some flow of flux but saturates at a very low portion of the flux in the electrical machine 150, so it retards the flow of large amounts of flux between the two ferromagnetic rotor portions 153, 154. Alternatively, the shaft 158 could be made of low permeability material such as stainless steel, to minimize short-circuiting of flux around the airgap 157. In this design, the insulator is comprised of two thin steel discs that connect the ferromagnetic rotor portions 153, 154 to the shaft 158. The benefit of this type of construction can be easier fabrication since each ferromagnetic rotor portion 153, 154 and shaft 158 can be made from a single piece of material if desired. The shaft 158 is journalled between bearings 159, 160 that are mounted with end plates 161, 162. An outer tube 172 axially separates the end plates 161, 162.

One or both of the ferromagnetic rotor portions 153, 154 contain multiple protrusions 156 around a circumference that face the axial armature air gap 157 between the two portions 153, 154. An axial gap air core armature 163 having end turns 164 is inserted in the axial armature air gap 157. The stator 152 surrounds the rotor 151. Field coils 165, 166 generate homopolar flux that is conducted in a flux path 171 to the rotor 151 through an outer ferromagnetic yoke 167, 168, 172. The flux in the flux path 171 travels across two rotor-to-stator air gaps 169, 170 to the ferromagnetic rotor portions 153, 154 and generates homopolar flux in the protrusions 156. Heat from the field coils 165, 166 is easily removed to the yoke 167, 168, 172.

Figure 6:
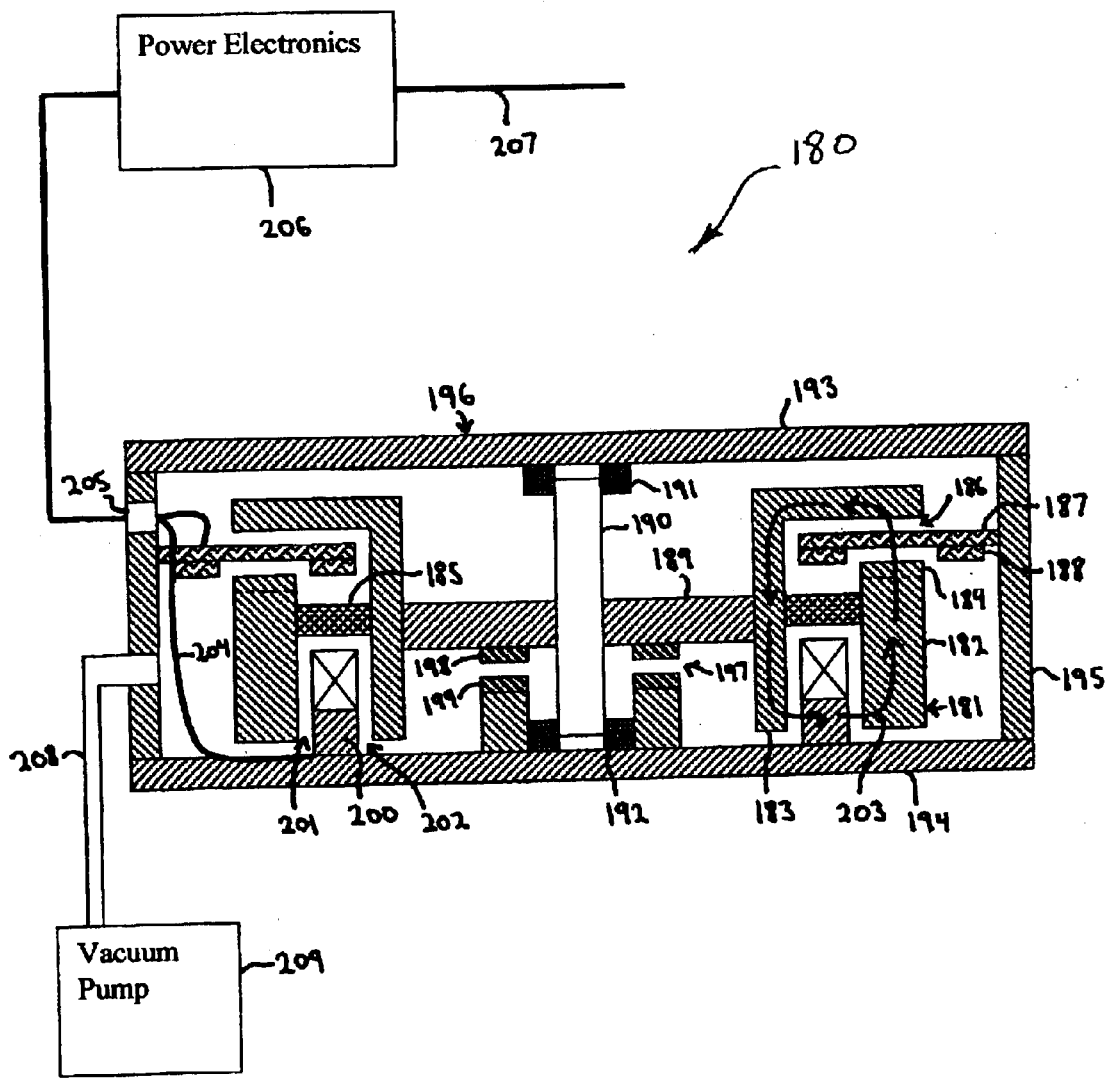
FIG. 6 is a schematic elevation of an alternate configuration flywheel system incorporating a brushless electrical machine in accordance with the invention.

An alternate configuration flywheel system 180 incorporating a different brushless electrical machine in accordance with the invention is, shown in FIG. 6. The flywheel system 180 includes a flywheel rotor 181 that is enclosed in a sealed container 195. As with the other configurations, the rotor 181 is constructed of two ferromagnetic co-rotating rotor portions 182 and 183 that are separated by a magnetic insulator 185. In this case, the ferromagnetic rotor portions 182, 182 provide a flux path 203 through an outer annular rim portion 182 and an inner annular rim portion 183. The outer rim 182 contains multiple axial protrusions 184 and forms an axial armature air gap 186 with the inner rim 183. The protrusions 184 are preferably at the larger diameter of the outer rim 182 for both higher voltage generation and also for storing energy. The rim 182 and its protrusions 184 are preferably made about twice as thick as the inner rim 183 so that the protrusions 184 do not saturate in operation.

The inner rim 183 is attached to a hub 189 that connects to a central shaft 190. The shaft is journalled in upper and lower mechanical bearings 191, 192. A passive repulsive magnetic bearing 197 supports the weight of the flywheel 181. The magnetic bearing 197 uses a rotating magnet 198 that axially repels a stationary magnet 199. The mechanical bearings 191, 192 resist any radial forces from operation. Other types of bearing systems could also be applied. A stationary field coil 210 attached to a stationary yoke 200 generates homopolar flux that flows in the flux path 203 to the flywheel through two rotor-to-stator air gaps 201, 202. The flux through an air core armature 187 in the airgap 186 induces an AC voltage in the windings of the armature 187. The end turns 188 are preferably located at inner and outer diameters of the axial armature air gap 186. The heat generated from the field coil 210 is efficiently removed through the yoke 200. Wires 204 from the field coil 210 and armature 187 exit the container 195 through a sealed connected 205 and are connected to external power electronics 206 for converted power 207. A vacuum pump 209 connects to the container 195 through a vacuum port 208.

Figure 7:
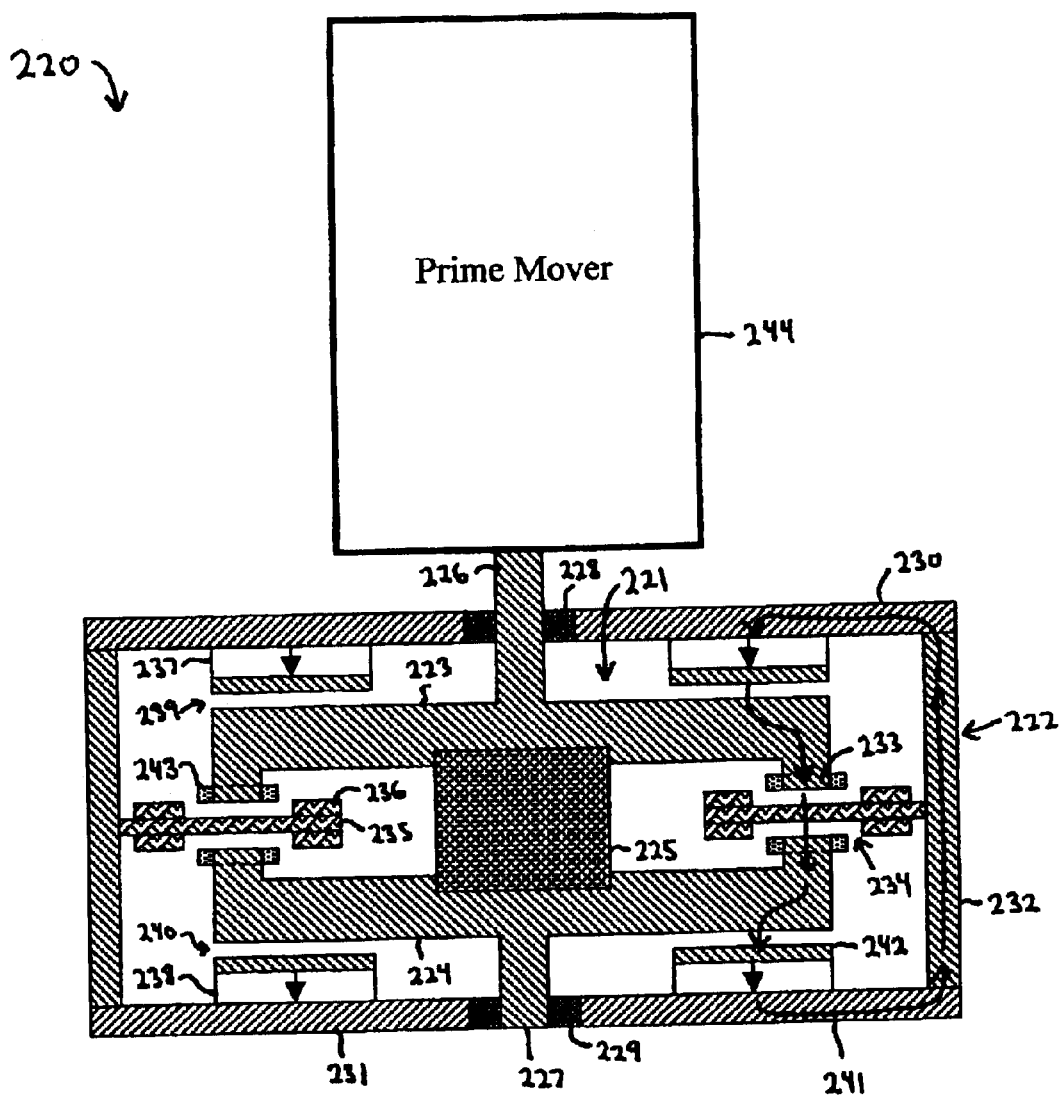
FIG. 7 is a schematic elevation of a third alternate configuration brushless electrical machine in accordance with the invention.

Although shown thus far only with the advantageous use of a field coil for generating homopolar flux in the electrical machine, other configurations can be constructed using permanent magnets for generation of magnetic flux across the air core armature airgap, although these configurations do not obtain all of the benefits of a controllable field and performance, compared to field coil versions. Such a permanent magnet configuration brushless electrical machine 220, shown in FIG. 7, is constructed with a rotor 221 and a stator 222, and with permanent magnets 237 and 238 for generating such flux. The rotor is comprised of two ferromagnetic cylindrical rotor portions 223, 224 that are separated by a magnetic insulator 225. At the outer periphery of one or both of the ferromagnetic rotor portions, axial protrusions 233 face an axial armature air gap 234 created between the two ferromagnetic rotor portions. Shafts 226, 227 support the rotor 221 in bearings 228, 229 that are attached to housing end plates 230, 231. Located in the axial armature air gap 234 is an axial gap air core armature 235, with its end turns preferably beyond the axial armature air gap 234.

In this configuration, the permanent magnets 237, 238 are used to generate homopolar flux in a flux path 241 through the protrusions 233 of the rotor 221. The flux path 241 includes the top and bottom plates 230, 231 and cylindrical tube 232 of the housing that serve as a ferromagnetic yoke and two rotor-to-stator airgaps 239, 240 to the rotor 221. Although shown with two magnets 237, 238, only one or multiple magnets could be used. Likewise, the magnets 237, 238 are shown bounding the rotor-to-stator air gaps 239, 240 but they could be located elsewhere in the yoke 230, 231, 232. There is an advantage to placing the magnets 237, 238 such that they bound the rotor-to-stator air gaps 239, 240. The magnets 237, 238 force the flux 241 to be circumferentially uniform throughout the yoke 230, 231, 232. Therefore, the distances from the axial armature air gap 234 to the permanent magnets can potentially be reduced for a lighter weight or more uniform higher efficiency electrical machine. In very large electrical machines, however, it is not possible to fabricate single piece magnets and as such they can be made from circumferential arc pieces. To insure the magnetic field uniformity entering the rotor discs 223, 224, ferromagnetic pole covers 242 can be utilized. The pole covers 242 circumferentially smooth the flux before crossing the rotor-to-stator airgaps 239, 240. Poles covers can also be utilized for radial permanent magnet electrical machines to insure radial magnetic flux uniformity.

One advantage of the invention is that magnetic flux from a large surface area can be concentrated to a high flux density in the protrusions 223 at the outer diameter of the rotor 221 for maximum power capability. In this way, even lower cost magnets and low energy product can be used to produce a high power motor/generator. Costly and speed limiting magnet reinforcement is eliminated and a larger amount of permanent magnets can be utilized than in a rotating magnet electrical machine. As the rotor 221 rotates, AC voltage is generated in the armature 235 but the voltage is solely dependent on the speed unlike the previous field coil designs.

As shown, the electrical machine 220 can be utilized as a high power generator. In this case, a prime mover 244 such as an engine or turbine can drive the rotor 221. One application for such systems is in high efficiency and reliability power generation and pulse power systems for weapons and industrial applications. In pulse power weapons systems, very high power pulses are extracted from the air core armature 235. When power is being extracted, the high armature current causes armature reaction flux that opposes the magnet flux 241. To extract the highest power capability, high electrical conductivity protrusion rings 243 or covers can be added to the protrusions 233. Copper protrusion rings 243 encircle the protrusions 233 and resist changes of flux through them cause by rapidly increasing armature currents during discharging. Other type of compensators can also be used to reduce the effects of armature reaction for high power pulse generation.

Figure 8:
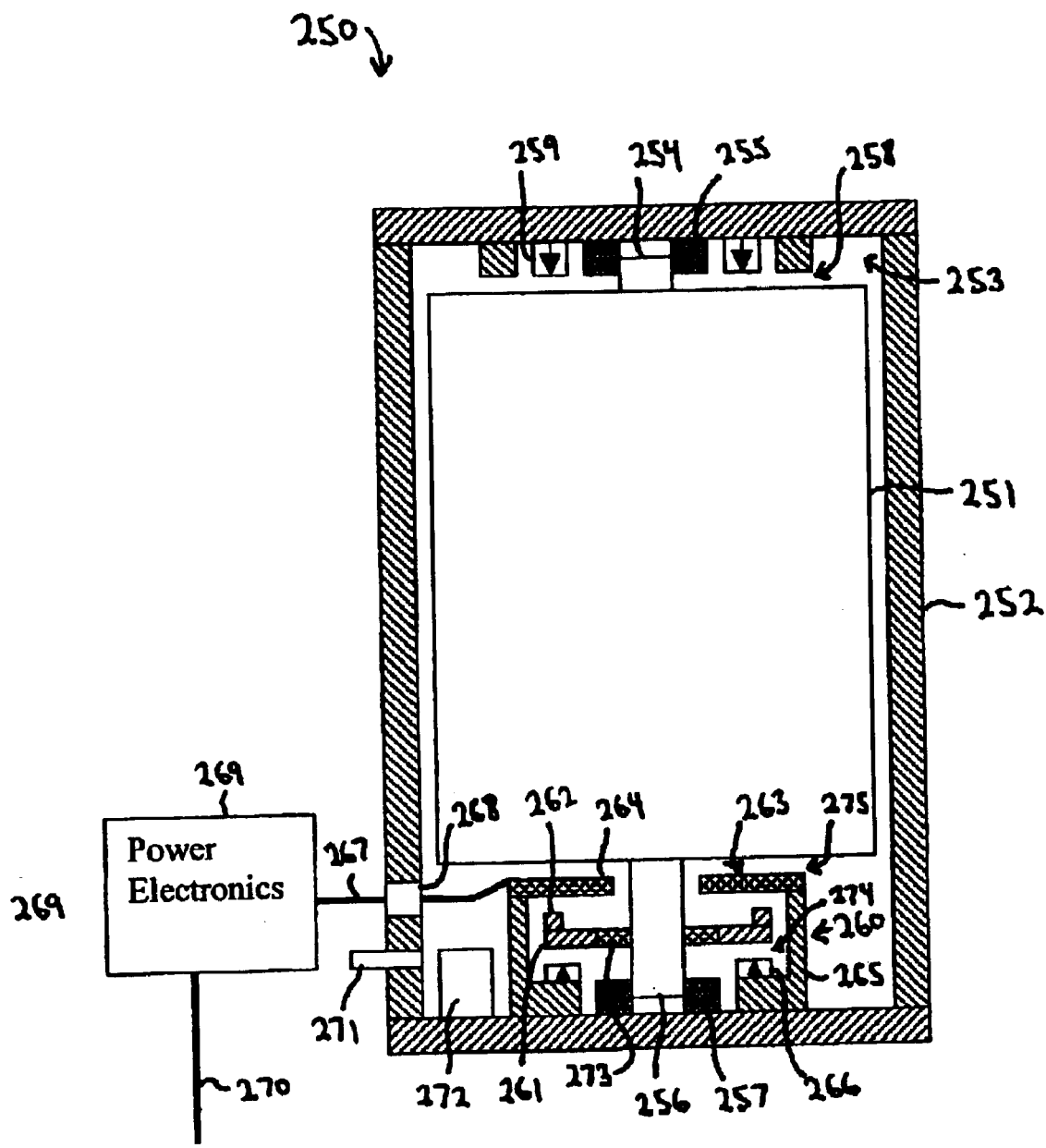
FIG. 8 is a schematic elevation of a second alternate configuration flywheel system incorporating a brushless electrical machine in accordance with the invention.

Another alternate configuration flywheel system 250 incorporating a brushless electrical machine 260 in accordance with the invention is shown in FIG. 8. The flywheel system 250 includes a flywheel 251 that is enclosed within a sealed container 252. The flywheel 251 is constructed of solid steel, however other construction such as those that utilize composite materials could also be used. The flywheel 251 has upper and lower shafts 254, 256 that are supported in upper and lower mechanical bearings 255, 257. A magnetic bearing 258 using a permanent magnet ring 259 supports most of the weight of the flywheel 251. The flywheel 251 and a pole ring 276 provide a return flux path for the flux from the magnet ring 259.

In this configuration the electrical machine 260 is attached to the flywheel 251 by way of the shaft 256. Two ferromagnetic rotor portions 251 and 261 are separate by a magnetic insulator 273. One of the rotor portions is the steel flywheel rotor 251, although a separate ferromagnetic portion could be used instead, if desired. The other ferromagnetic rotor portion 261 contains multiple axial protrusions 262 facing an axial armature air gap 263 between the two ferromagnetic rotor portions 251, 261. In the axial armature air gap 263 is an axial gap air core armature 264 that converts between electrical and rotational energy. A permanent magnet 266 attached to a ferromagnetic yoke 265 drives homopolar flux through the protrusions 262 and generates AC voltage in the armature 264 as the flywheel 251 rotates. The flux is conducted to the ferromagnetic rotor portions 251, 261 through two rotor-to-stator air gaps 274, 275. The flux path for the flux from the permanent magnet 266, crosses the airgap 274 and through ferromagnetic rotor portion 261. It passes through the armature 263 in the airgap 275, then up through the full axial length of the flywheel 251, across the airgap into the pole ring 276 outside the ring magnet 259, then back down the housing 252 and back to the magnet 266 through the yoke 265.

Wires 267 from the armature 264 exit the container 252 through a sealed feedthrough 268 and are connected to external electronics 269 and a power buss 270. The container 252 is maintained with an internal vacuum 253 through the use of an internal getter 272. A pinch off tube 271 allows external pumping for initial establishment of the vacuum 253.

Figure 9:
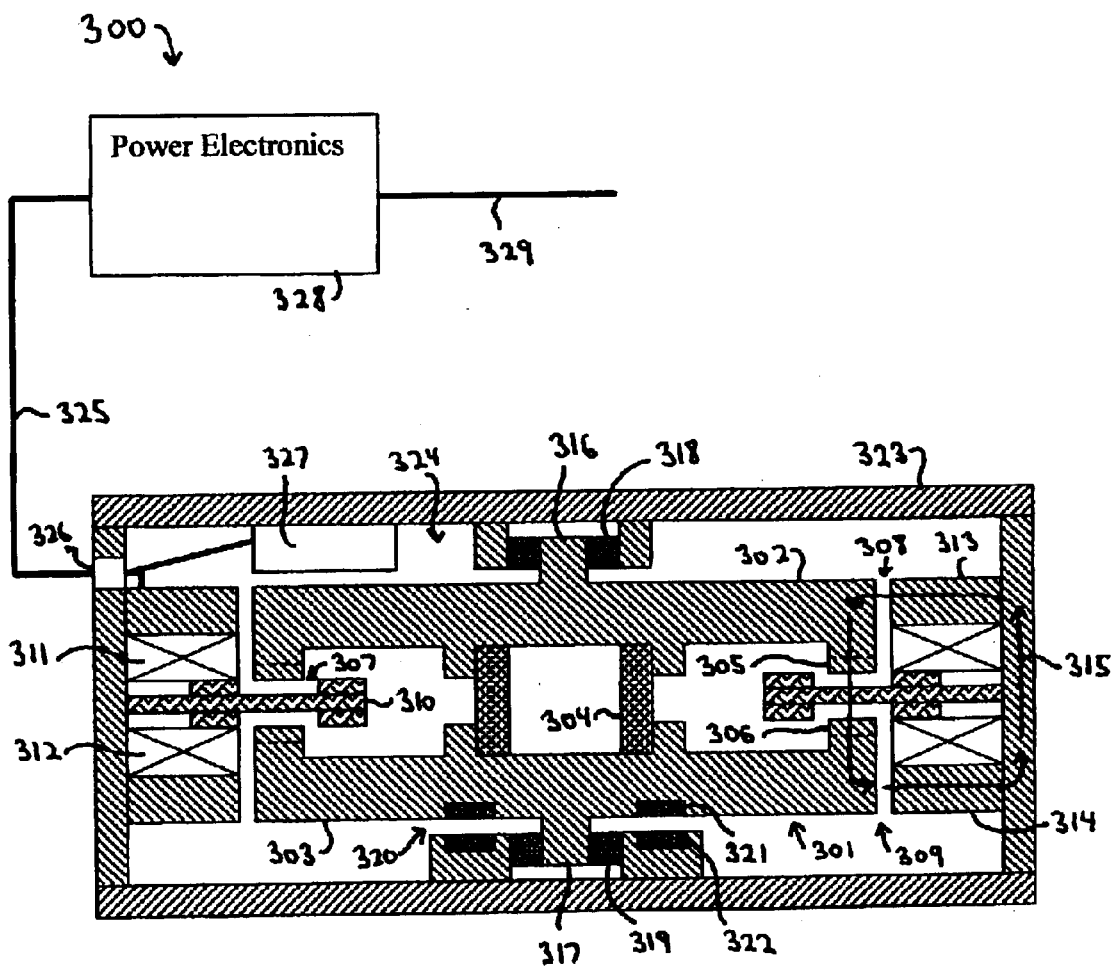
FIG. 9 is a schematic elevation of a third alternate configuration flywheel system incorporating a brushless electrical machine in accordance with the invention.

A third alternate configuration flywheel system incorporating a brushless electrical machine in accordance with the invention is shown in FIG. 9 in a flywheel UPS system 300, including a flywheel 301 mounted for rotation inside a sealed container 323. The flywheel 301 is constructed from two high strength steel discs 302, 303 that are axially separated by a magnetic flux limiting connection in the form of a stainless steel tube 304. The two discs 302, 303 could alternatively be connected together with a ferromagnetic connection as long as sufficient flux 315 still traversed the armature airgap for effective operation. The tube 304 is interference fit between the discs 302, 303. Each disc 302, 303 has multiple axially extending protrusions 305, 306 around the diameter that face an armature airgap 307. An air core armature 310 is located in the armature airgap 307. The air core armature 310 is constructed of multiple electrical windings on a substantially nonmagnetic annular supporting structure. The armature windings are preferably wound with multiple individually insulated strand wire or Litz wire to minimize generation of eddy current losses in the conductors.

Field coils 311, 312 generate homopolar flux 315 that is conducted to and from the rotor 301 through outer yoke rings 313, 314. The magnetic flux 315 crosses two rotor-to-stator radial airgaps 308, 309 between the rotor discs 302, 303 and the yoke rings 313, 314. The high reluctance of the rotor-to-stator airgaps 308, 309 allows the flux 315 to become circumferentially smoothed.

The rotor 301 is supported for rotation about a substantially vertical axis by upper and lower shafts 316, 317 that are journalled in upper and lower radial ball bearing sets 318, 319. To greatly extend the life of the ball bearing sets 318, 319, a passive axial magnetic repulsion bearing 320 carries the axial weight of the flywheel 301. The radial ball bearing sets can be loosely mounted to the container 323 to eliminate all axial loading if desired. The passive axial magnetic repulsion bearing 320 is comprised of rotor ring magnets 321 that axially repel adjacent stator rings magnets 322 attached to the housing 323.

The inside of the container 323 is maintained with a vacuum 324 by an internal getter pump 327. Wires 325 exit the container 323 through a sealed feedthrough 326. The wires 325 connect the armature 310, field coils 311, 312 and any other internal electrical connections to power electronics 328 for conversion to external power 329. One benefit of this flywheel system 300 is that the field coils 311, 312 can be used for regulating the output power during discharging to maintain a constant voltage. In operation, the field coils 311, 312 may be constantly energized with some amount of current so that output power can be provided instantaneously when needed. Because the field coils 311, 312 are attached to the housing 323, the have a good heat transfer that limits their temperature for long life. Fins, not shown can be added to the container 323 to dissipate heat, if required.

Yet a further benefit of this flywheel system 300 is that the yoke rings 313, 314 and the field coils 311, 312 surround the flywheel 301. Besides forming the motor/generator, they also provide added safety containment in the unlikely event that the flywheel or bearings 318, 319 would have a failure.

The use of radial rotor-to-stator airgaps 308,309 eliminates generation of axial direction loads on the radial ball bearings 318, 319. In this way, the motor/generator is completely decoupled from the bearing system axial loads for greatly extended bearing life and reliability. The simple passive axial repulsion magnetic bearing 320 carries the weight of the flywheel 301 without interference from variations of the magnetic flux 315. If the flywheel 301 is perfectly radially centered, no radial forces are generated by the magnetic flux 315. However, due to tolerances in the machining of the flywheel system parts, the flywheel may be off center some small amount. The rotor-to-stator airgaps 308, 309 would be smaller on one side of the flywheel 301 than on another side. The result would be generation of large radial magnetic attraction forces in one radial direction. These forces would tend to radially load the radial ball bearing sets 318, 319. To overcome this problem and limit the radial bearing loads for achieving the longest life, the rotor-to-stator airgaps can be increased to a larger value than is necessary for simply circumferentially smoothing the flux 315. The increased airgaps 308, 309 may require increased current to the field coils 311, 312 or even larger field coils 311, 312. However, radial ball bearing loads can be kept very small, despite machining tolerances. A radial ball bearing life of greater than 20 years can be achieved.

Figure 10:
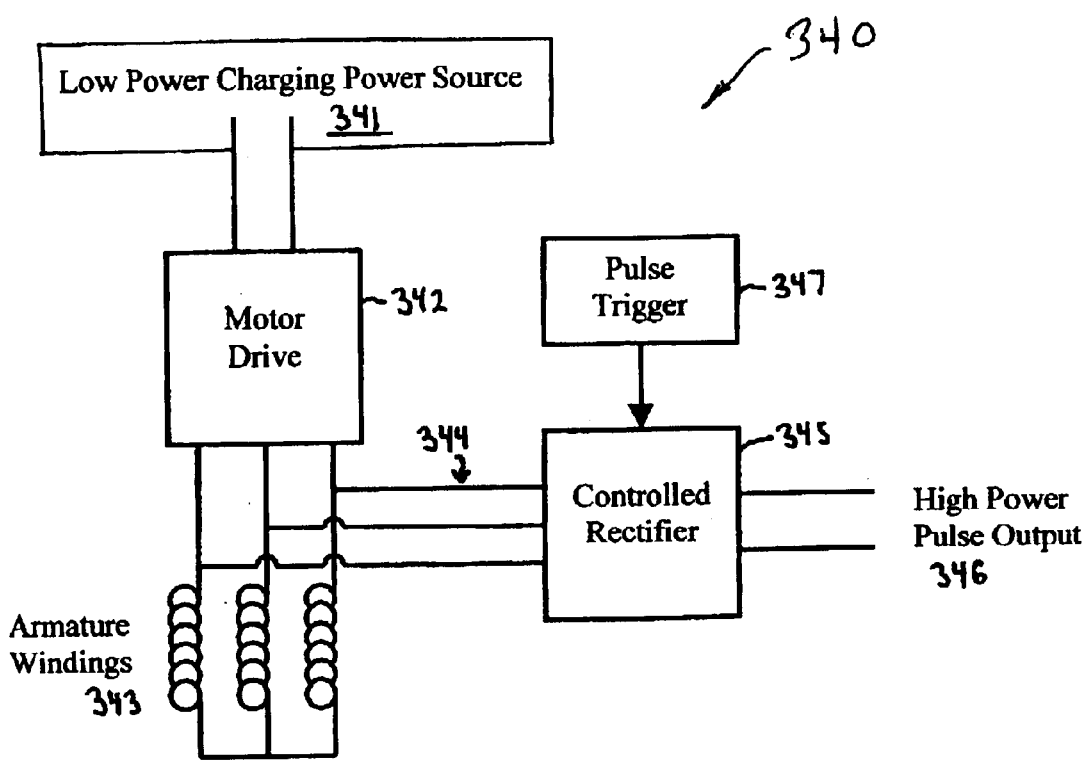
FIG. 10 is a schematic drawing of a pulse power circuit for a brushless electrical machine in accordance with the invention.

A pulse power circuit for a brushless electrical machine in accordance with the invention is shown in FIG. 10. The power system 340 utilizes a charging power source 341 that is connected to a motor drive 342. The motor drive 342 converts input power 340 to synchronous power for the armature windings 343, which accelerates the flywheel rotor. When the pulse power system is driven by a prime mover instead of an electrical power source 341, the motor drive 342 would not be used. The armature windings 343 provide high frequency AC power 344 to a controlled rectifier 345 that converts power to DC pulsed output 346. A pulse trigger 347 applies a gate signal to initiate the pulse output 346. One advantage of the pulse power system 340 of the invention is that the armature windings 343 generate AC power 344. AC power periodically passes through zero voltage allowing for reliable natural commutation turn off of pulsed power when the pulse trigger signal is removed form the controlled rectifier 345.

Figure 11:
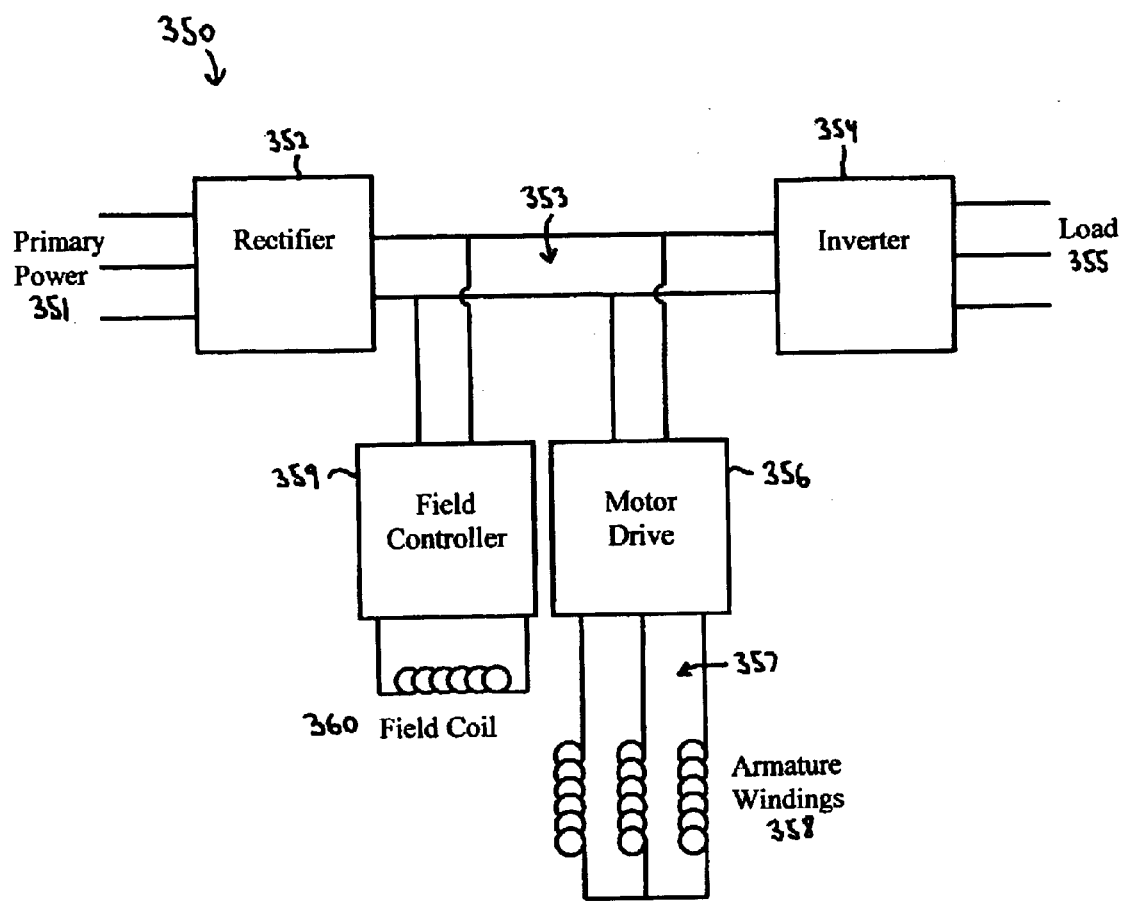
FIG. 11 is a schematic drawing of a flywheel uninterruptible power supply circuit for a brushless electrical machine in accordance with the invention.

A flywheel uninterruptible power supply circuit for a brushless electrical machine in accordance with the invention is shown in FIG. 11 in a UPS 350, which takes in primary power 351 and supplies protected power to a load 355. The primary power 351 is rectified by a rectifier 352 and supplied to a DC buss 353. Voltage in the DC buss 353 is inverted by an inverter 354 to supply the load 355. A motor drive 356 is connected to the DC buss 353 and supplies synchronous AC power 357 to armature windings 358 of the flywheel motor generator. Also connected to the DC buss 353 is a field controller 359. The field controller 359 controls the current to the field coil 360. During an interruption of primary power 351, the power generated from the armature windings 358 flows back to the DC buss 353 to supply the load 355. As the flywheel speed slows, the field controller 359 increases the current to the field coil 360 to maintain the voltage level at the DC buss 353.

One of the advantages of the invention is the simplified air core armature construction. Air core armatures require generally strict dimensional tolerances to prevent contact with the rotating rotor and to minimize the required armature airgap for high efficiency and power capability at low cost. In many air core electrical machines, the air core armature is located against a laminated stator structure that imparts a high dimensional accuracy. This method unfortunately does not achieve the benefits of double rotating topology wherein the rotor bounds both side of the armature. In double rotating air core electrical machines of the invention, the armature itself needs to have high geometrical and dimensional accuracy. Radial gap armatures must hold a perfectly circular shape with a very thin structure, which can be exceedingly difficult. The invention overcomes these difficulties through use of an axial gap air core armature in the double rotating air core topology. Making an accurate flat armature is relatively easy. Several methods for armature construction can be utilized including winding on a form or even bonding together individually wound coils.

A schematic plan view of an axial gap air core armature for a brushless electrical machine in accordance with the invention is shown in FIG. 12A. In this construction, the axial gap air core armature 370 is fabricated by winding electrical conductors onto a fiberglass laminate form 371. The active lengths 372 travel radially and are located on one side of the form 371. An elevation view of an axial gap air core armature for a brushless electrical machine in accordance with the invention is shown in FIG. 12B. In this case, the armature utilizes a single layer construction. The active lengths 372 traverse radially and are located on one side of the form 371. The end turns 373, traversing circumferentially, are located on the opposite side of the form 371. An elevation view of a double stack air core armature is shown in FIG. 12C. In this configuration, two armatures are stacked together with spacers 374. The end turns 373 are located on opposing sides and active lengths 372 located together in order to minimize the required axial armature airgap. Other methods of constructing the air core armature can also be used.

Figure 13A:
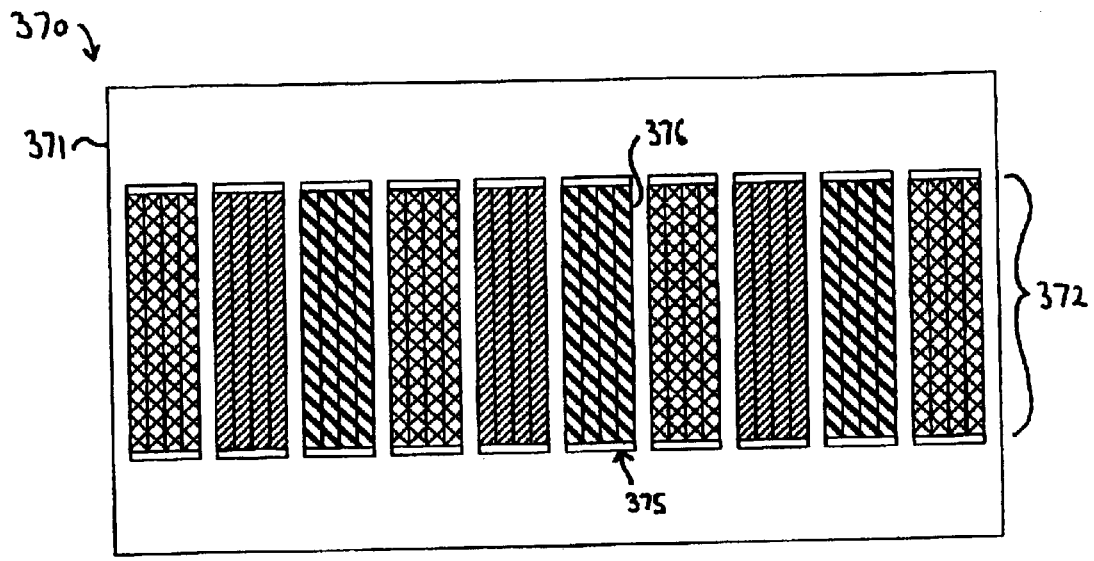
FIG. 13A is a circumferential section of an axial gap air core armature (top side) for a brushless electrical machine in accordance with the invention.
Figure 13B:
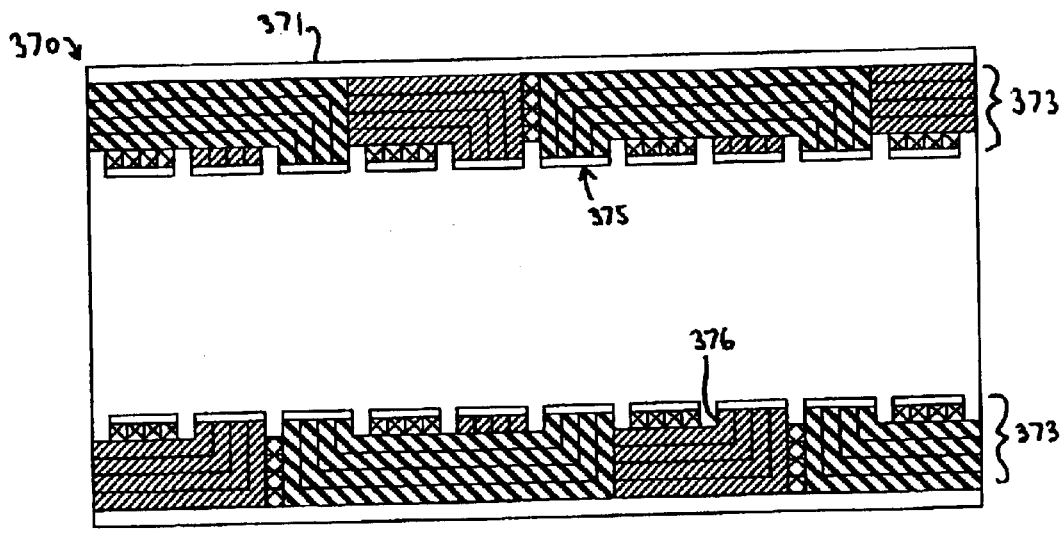
FIG. 13B is a circumferential section of an axial gap air core armature (bottom side) for a brushless electrical machine in accordance with the invention.

A circumferential section of an axial gap air core armature (top side and bottom side) for a brushless electrical machine in accordance with the invention is shown in FIGS. 13A and 13B. The air core armature 370 has multiple radial traversing active lengths 372 on one side of the form 371 and end turns 373 on the opposite side. This minimizes the axial thickness of the armature 370. Multiple phase windings 376 pass through holes or slots 375 in the form 371 when transitioning between active lengths 372 and end turns 373. The armature 370 can be made as a single circular structure for simplicity or alternatively can be made from two or more circumferential sections that allows placement in the axial armature air gap after the two ferromagnetic rotor portions have already been assembled together. This allows for easier balancing of the rotor.

In all configurations of the brushless electrical motor generator, the device can be used as a motor or a generator. Some applications include pulsed power generation due to the robust high-speed rotor capability. In applications rotating in air, covers or spacers can be added over the rotor protrusion spaces so as to minimize air drag in operation. Likewise, field coils can be replaced with superconducting field coils. This allows them to be easily powered, reinforced against magnetic forces and cooled and provides for very high performance reliable electrical machines. The air core armature can be cooled by convection cooling, liquid cooling or conduction cooling.

Obviously, numerous modifications and variations of the described preferred embodiment are possible and will occur to those skilled in the art in light of this disclosure of the invention. Accordingly, I intend that these modifications and variations, and the equivalents thereof, be included within the spirit and scope of the invention as defined in the following claims, wherein I claim:

1. A brushless electrical machine for converting between electrical and mechanical energy comprising:
   a rotor supported on bearings for rotation about an axis of rotation, and a stator that is stationary and magnetically acts upon said rotor;
   said rotor includes two ferromagnetic rotor portions separated by a magnetic flux restricting structure to form an axial armature air gap between said ferromagnetic rotor portions;
   at least one of said two ferromagnetic rotor portions having multiple axial extending protrusions around a circumference, said protrusions facing said axial armature air gap;
   an air core armature located in said axial armature air gap, said air core armature comprising multiple radial traversing windings;
   a ferromagnetic yoke and homopolar flux generator mounted to said stator, said homopolar flux generator generating homopolar flux in said protrusions of said rotor and said ferromagnetic yoke forming two rotor-to-stator air gaps with said rotor;
   each said ferromagnetic rotor portion and said rotor-to-stator air gaps providing sufficient distance between said axial armature air gap and the surfaces of said ferromagnetic yoke at the rotor-to-stator air gap such that the circumferential magnetic flux distribution in said ferromagnetic yoke at the surface of the rotor-to-stator air gap is substantially uniform.

2. A brushless electrical machine as described in claim 1 wherein:
   said ferromagnetic yoke has an unlaminated, solid construction.

3. A brushless electrical machine as described in claim 1 wherein:
   said homopolar flux generator comprises a controllable field coil.

4. A brushless electrical machine as described in claim 1 wherein:
   said ferromagnetic rotor portions are constructed as solid discs with said magnetic flux restricting structure located axially between each said disc.

5. A brushless electrical machine as described in claim 4 wherein:
   said ferromagnetic yoke surrounds said rotor and forms two rotor-to-stator air gaps with said ferromagnetic rotor portions that are substantially radial.

6. A brushless electrical machine as described in claim 3 wherein:
   said ferromagnetic yoke surrounds said rotor and forms two rotor-to-stator air gaps with said ferromagnetic rotor portions that are substantially axial, each said rotor-to-stator air gap being substantially equal.

7. A brushless electrical machine as described in claim 3 wherein:
   said ferromagnetic rotor portions are constructed as axially spaced rings, and said magnetic flux restricting structure connects said rings and has a maximum diameter that is substantially less than the maximum diameter of said rings.

8. A brushless electrical machine as described in claim 7 wherein:
   said rings radially reinforce said magnetic flux restricting structure.

9. A brushless electrical machine as described in claim 1 wherein:
   said electrical machine is used in a flywheel energy system.

10. A brushless electrical machine as described in claim 9 wherein:
    said homopolar flux generator comprises a field coil for varying said homopolar flux in said protrusions of said rotor.

11. A brushless electrical machine as described in claim 9 wherein:
    said flywheel energy system comprises a flywheel that is supported to rotate about a substantially vertical axis by upper and lower mechanical bearings and an axial magnetic bearing carries a portion of weight of said flywheel.

12. A brushless electrical machine as described in claim 9 wherein:
    said flywheel energy system comprises a flywheel that is constructed of an outer rim and an inner return path, said outer rim and said inner return path forming said two ferromagnetic rotor portions;
    said magnetic flux restricting structure is located radially in between and connects said outer rim and said inner return path;
    said outer rim contains said protrusions and forms said axial armature air gap with said inner return path.

13. A brushless electrical machine as described in claim 1 wherein:
    said magnetic flux restricting structure includes a ferromagnetic material that geometrically provides a high reluctance to the flux from said homopolar flux generator.

14. A brushless electrical machine as described in claim 1 wherein:
    said homopolar flux generator comprises a permanent magnet.

15. A brushless electrical machine as described in claim 14 wherein:
    a ferromagnetic pole cover on a permanent magnet bounds at least one of said two rotor-to-stator air gaps.

16. A brushless electrical machine as described in claim 15 wherein:
    said permanent magnet has an axial magnetization.

17. A brushless electrical machine as described in claim 14 wherein:
    said electrical machine is used in a flywheel energy system.

18. A method for converting between electrical and mechanical energy with an electrical machine comprising:
    rotating a rotor about an axis, and magnetically acting upon said rotor with a stator having a ferromagnetic yoke;
    generating homopolar flux in said rotor with a homopolar flux generator mounted to said stator, said homopolar flux generator and said ferromagnetic yoke forming two rotor-to-stator air gaps with said rotor;
    passing said homopolar magnetic flux from said stator across an axial armature air gap between two spaced ferromagnetic rotor portions of said rotor, and minimizing short-circuiting of said flux between said rotor portions with a magnetic insulator separating said two ferromagnetic rotor portions;

focusing said flux across said axial armature air gap into multiple, axially projecting rays of flux through multiple axial extending protrusions facing said axial armature air gap around a circumference of at least one of said ferromagnetic rotor portions;

providing or extracting electrical power to or from air core armature windings in an air core armature located in said axial armature air gap, said air core armature comprising multiple radial traversing phase armature windings.

19. A method as described in claim 18 wherein:

each said ferromagnetic rotor portion and said rotor-to-stator air gaps providing sufficient distance between said axial armature air gap and the surfaces of said ferromagnetic yoke at the rotor-to-stator air gap such that the circumferential magnetic flux distribution in said ferromagnetic yoke at the surface of the rotor-to-stator air gap is substantially uniform.

20. A method as described in claim 19 wherein:

said homopolar flux generator comprises a field coil.

21. A method as described in claim 19 wherein:

said electrical machine is used in a flywheel energy system.

22. A method as described in claim 19 wherein:

said homopolar flux generator comprises at least one permanent magnet.

23. A brushless electrical machine for converting between electrical and mechanical energy comprising:

a rotor supported on bearings for rotation about an axis of rotation, and a stator that is stationary and magnetically acts upon said rotor;

said rotor includes two ferromagnetic rotor portions connected by a magnetic flux limiting structure and forming an axial armature air gap between said ferromagnetic rotor portions;

at least one of said two ferromagnetic rotor portions having one or more axial extending protrusions around a circumference, said one or more protrusions facing said axial armature air gap;

an air core armature located in said axial armature air gap, said air core armature comprising multiple radial traversing windings;

a ferromagnetic yoke and homopolar flux generator mounted to said stator, said homopolar flux generator generating homopolar flux in said one or more protrusions of said rotor and said ferromagnetic yoke forming two rotor-to-stator air gaps with said rotor;

each said ferromagnetic rotor portion and said rotor-to-stator air gaps providing sufficient circumferential smoothing of said homopolar flux such that the circumferential magnetic flux distribution in said ferromagnetic yoke at the surface of the rotor-to-stator air gap is substantially uniform.

24. A brushless electrical machine as described in claim 23 wherein:

said brushless electrical machine accelerates and decelerates a flywheel for storing and retrieving energy in a flywheel energy system.

25. A brushless electrical machine as described in claim 24 wherein:

said axis of rotation is substantially vertical, said rotor-to-stator air gaps are substantially radial and an axial magnetic bearings provides some axial lift support for said flywheel.

26. A brushless electrical machine as described in claim 23 wherein:

said air core armature has a multiple circumferential piece construction that allows installation in said axial armature air gap after said two ferromagnetic rotor portions have been assembled together.

* * * * *